United States Patent
Raina et al.

(10) Patent No.: US 9,693,078 B2
(45) Date of Patent: Jun. 27, 2017

(54) METHODS AND SYSTEMS FOR DETECTING BLOCK ERRORS IN A VIDEO

(71) Applicant: Interra Systems, Inc., Cupertino, CA (US)

(72) Inventors: Akshi Raina, Jammu (IN); Shekhar Madnani, Noida (IN)

(73) Assignee: Interra Systems, Inc., Cupertino, CA (US)

( * ) Notice: Subject to any disclaimer, the term of this patent is extended or adjusted under 35 U.S.C. 154(b) by 414 days.

(21) Appl. No.: 14/327,236

(22) Filed: Jul. 9, 2014

(65) Prior Publication Data

US 2016/0014433 A1    Jan. 14, 2016

(51) Int. Cl.

| | |
|---|---|
| *G06K 9/34* | (2006.01) |
| *G06K 9/36* | (2006.01) |
| *G06K 9/40* | (2006.01) |
| *H04N 7/01* | (2006.01) |
| *H04N 5/00* | (2011.01) |
| *H04N 19/89* | (2014.01) |
| *H04N 19/86* | (2014.01) |

(52) U.S. Cl.
CPC ............. *H04N 19/89* (2014.11); *H04N 19/86* (2014.11)

(58) Field of Classification Search
CPC .. G06K 9/34; G06K 9/36; G06K 9/40; H04N 7/00; H04N 7/01; H04N 5/00
See application file for complete search history.

(56) References Cited

U.S. PATENT DOCUMENTS

| | | | | |
|---|---|---|---|---|
| 2006/0098870 | A1* | 5/2006 | Tek ......................... | G06K 9/342 382/173 |
| 2006/0139491 | A1* | 6/2006 | Baylon ................... | H04N 5/144 348/558 |

\* cited by examiner

*Primary Examiner* — Behrooz Senfi
*Assistant Examiner* — Maryam Nasri
(74) *Attorney, Agent, or Firm* — Next IP Law Group

(57) ABSTRACT

Systems and Methods for efficient and reliable detection of error blocks in a video based on detecting one or more candidate blocks in a region of interest and then verifying the block error on the basis of the patterns formed inside the candidate block and its distinction from the surrounding blocks spatially and/or temporally.

6 Claims, 13 Drawing Sheets

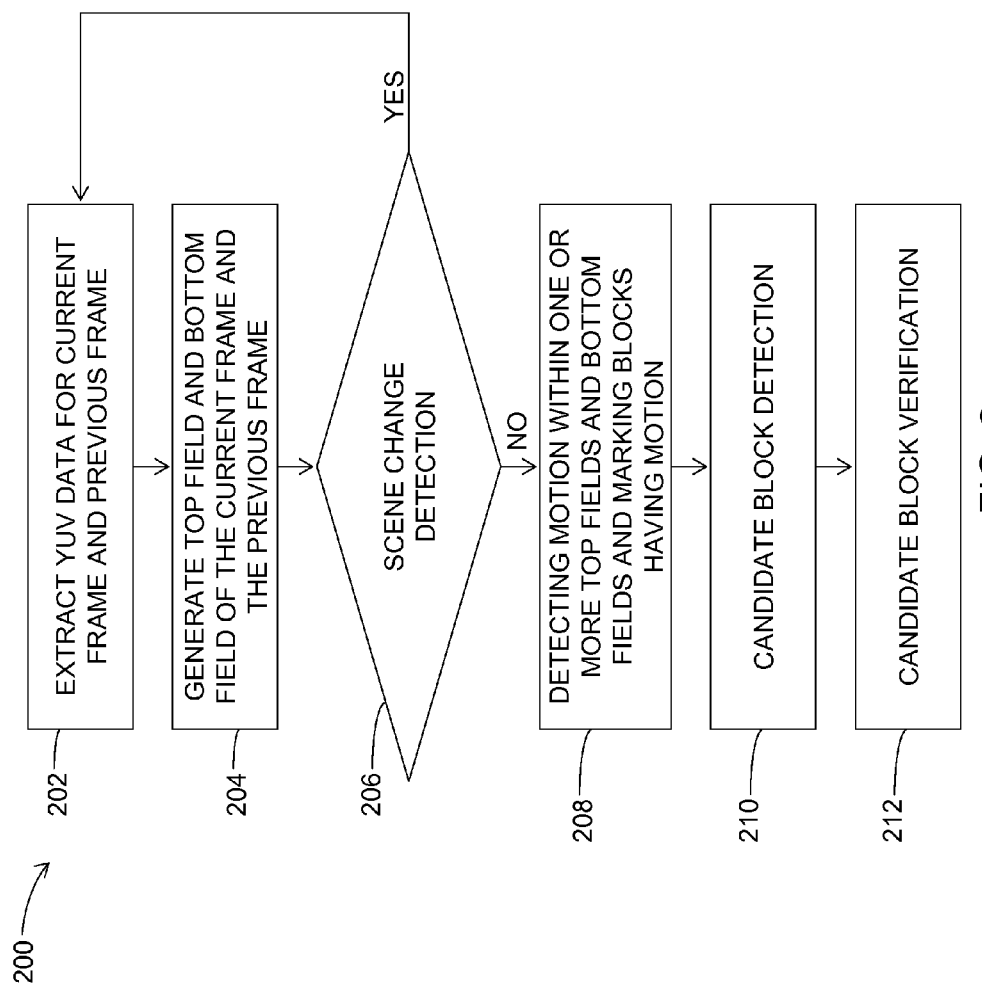

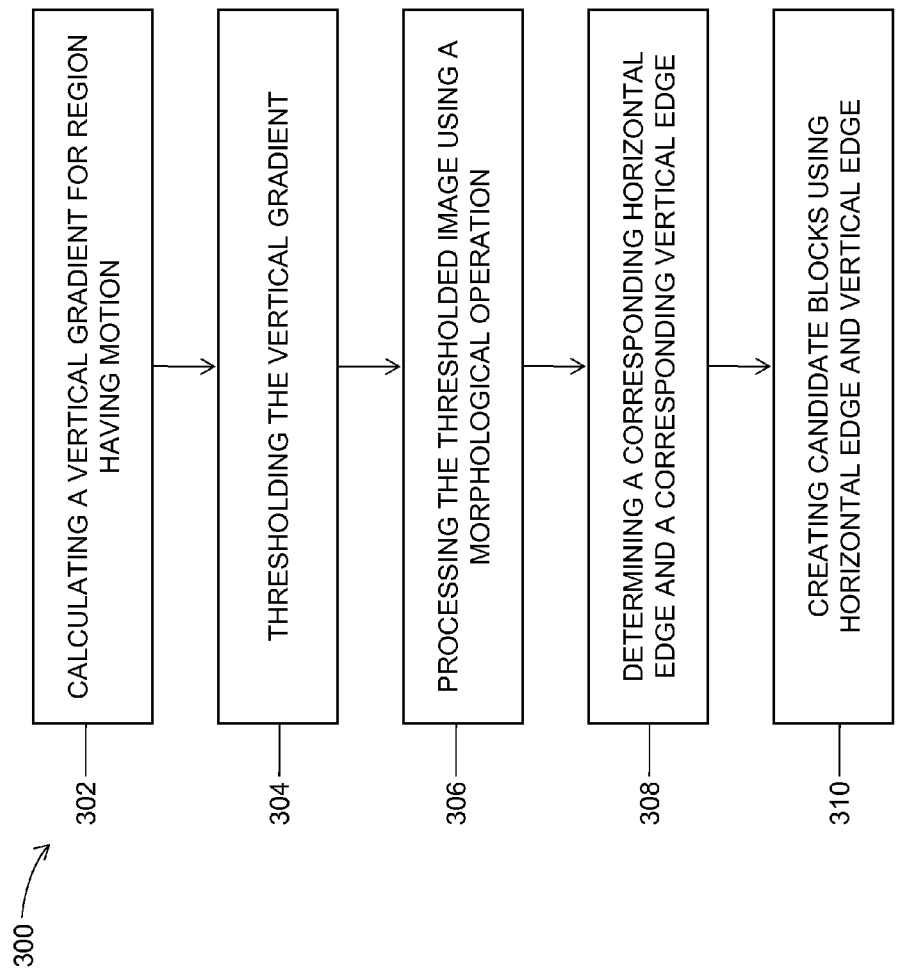

METHODS AND SYSTEMS FOR DETECTING BLOCK ERRORS IN A VIDEO

FIELD OF THE INVENTION

The present disclosure broadly relates to error detection in a video sequence. More particularly the present disclosure relates to systems and methods for detecting block errors in a video sequence.

BACKGROUND OF THE INVENTION

A video sequence comprises of a plurality of frames being consecutively displayed at a certain frame rate. For example, a movie may be displayed at 24 Hz i.e. 24 frames per second or a video on television according to NTSC standards may be displayed at 30 Hz i.e. 30 frames per second. These video frames are represented by a grid of pixel values to display intensity and color on the viewer's screen. The frames of a video sequence may be classified under three categories namely Intra-frames or I-frames, Predictive frames or P-frames and Bi-directional frames or B-frames, as mentioned under MPEG-2 standard. I-frames are the frames encoded in the same manner as still images and contain sufficient information to display an entire image. P-frames use previous reference frames to determine what the current frame will be by recording changes between a previous frame and the current frame. Whereas B-frames use previous and subsequent frames to determine what the current frame will be. Typically, an interlaced video consists of two fields that make up each video frame. Each field contains half the number of horizontal lines in the frame; the top field contains all of the odd-numbered lines, and the bottom field contains all of the even-numbered lines. An interlaced video monitor displays each frame by first drawing all of the lines in one field and then drawing all of the lines in the other field.

The video is encoded and then compressed before transmission or storage because a video can require an enormous amount of digital storage if left uncompressed. A video may be compressed based on video compression formats such as MPEG-2 Part 2, MPEG-4 Part 2, H.264 (MPEG-4 Part 10), HEVC, Theora, Dirac, RealVideo RV40, VP8, and the like. In most of the compression standards or block based encoding formats, the video frame is divided into macroblocks. A macroblock is a group of pixels, for example a macroblock could be a matrix of 16 pixels×16 pixels. These macroblocks are encoded using transforms such as Discrete Cosine Transform (DCT), which essentially represents the data inside the block as the sum of various patterns or frequencies. While compressing, the video sequence is first sampled and then quantized. During the quantization step, the less required frequencies, or the less prominent patterns can be disregarded, and hence almost the similar representation of the block is achieved. Moreover, the compressed video may also be transmitted via channel such as a wireless channel that may be error prone. In any case, if any bit is corrupted during compression or during transmission, the corrupt bit may corrupt the entire information inside the block while decoding of the video frame. Due to the corrupted block, taking inverse of the DCT transform will result into absurd patterns in the block and hence causing perceivable corrupted blocks, which are known as block errors. Further, compressed video is easily afflicted by transmission errors, mainly because the information content of compressed video is generally coded using variable length codes. When a bit error alters the codeword to another one of different length, the decoder loses synchronization and decodes consecutive error free blocks incorrectly until the next synchronization code is received. The corrupted bitstream may heavily degrade the visual quality of any one or more individual frames or pictures.

Block error is one of the various types of errors that may be present in digital videos using compression techniques due to certain error in the DCT coefficients. The error may also be present in videos being transferred using error prone channels. In yet other cases, the error may even occur in videos while being transcoded from one video format to another. Hence, a block error may be present in videos present in various different formats. The block error is perceived in the form of corrupted blocks scattered all over the frame, sparsely or densely, and may persist over multiple frames, the corrupted block contains random high frequency corrupted data which cannot be corrected but can only be detected in a frame. The block errors may be generally viewed by a viewer as a checkerboard pattern/grid pattern or vertically lined blocks. To limit the degradations in frames caused by compression, error detection and/or error correction methods can be applied, retransmissions can be used, and/or effects from the received corrupted data can be concealed. Normally retransmissions provide a reasonable way to protect data streams from errors, but long round-trip delays associated with low bit-rate transmission and moderate or high error rates make it practically impossible to use retransmission, especially with real-time videophone applications. Error detection and correction methods usually require a large overhead since they add some redundancy to the data. One of the available methods extracts edges from an image that correspond to the DCT blocks. Such edges are processed to determine an edge energy value. The edge energy value is compared with a threshold to provide an alarm for an error block when the threshold is exceeded. The edge energies for each block may be summed and compared with an overall threshold value to generate the alarm, or the edge energy for each edge may be compared with an edge threshold value to determine which are good and which are suspect, with the alarm being set when at least three of the edges are suspect. However, the method does not detect the presence of block errors in video stream effectively.

Video standards may not provide for block error detection or concealment in the event of a corrupted bit stream. Hence, there exists a need for effective and generic systems and methods for detecting block errors in faulty video frames. Further, there is also a need for methods and systems for block error detection that are independent of the video format and the video encoding methodology.

BRIEF SUMMARY OF THE INVENTION

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure describes processing the frames having motion in a two phase method for detecting block errors. In the first phase, a predetermined number of video frames selected from the complete set of frames having motion are analyzed. The first phase results in detection of one or more candidate blocks, that is the blocks qualified upon the analysis for having block error properties. The second phase is the verification phase wherein the candidate blocks are verified with respect to the spatial and/or temporal neighbouring blocks. The patterns present inside the candidate blocks are compared for determining the distinction of such patterns from the patterns present inside the neighbouring blocks.

It is an object of the present application to provide generic systems and methods for detecting block errors in a video stream.

It is another object to provide methods and system that are independent of the format of the video being processed.

According to a first embodiment, a processor implemented method for detecting block errors in a video sequence having a plurality of frames is described. The frame comprises of a plurality of top fields and a plurality of bottom fields. The top fields are the odd numbered horizontal rows and the bottom fields are the even numbered horizontal rows that in combination result into a frame. The method according the first embodiment comprises the steps of:

a) detecting a scene change and determining a set of frames corresponding to a single scene;
b) detecting motion between two consecutive top fields or between two consecutive bottom fields corresponding to the set of frames determined in step a, and determining one or more blocks in the top field or bottom field having motion, wherein each block is a matrix of predetermined size containing pixel values;
c) determining one or more candidate blocks within the top field or bottom field determined in step b, comprising the steps of:
   calculating a vertical gradient for the motion area of the current top field and current bottom field;
   thresholding the vertical gradient using a predefined threshold;
   processing the thresholded image using a morphological operation for getting regions corresponding to block errors;
   determining a corresponding horizontal edge and a corresponding vertical edge for each rectangular region; and
   creating one or more candidate blocks using the horizontal edge and the vertical edge;
d) verifying the candidate blocks for determining the blocks with block error, comprising the steps of:
   determining number of intensity transitions in horizontal direction within the candidate blocks, and comparing the number of transitions with a first predefined threshold;
   if the number of intensity transitions is greater than the first predefined threshold then getting two separate sub-blocks each for even and odd vertical lines of the candidate blocks, and determining standard deviation for each of the sub-blocks;
   comparing the standard deviation for each of the sub-blocks with a second predefined threshold;
   if the standard deviation is lesser than the second predefined threshold then creating a transition map for the block; and
   verifying the number of sign changes within the transition map; and presence of repeating pattern in the transition map using a FFT pattern detection module.

According to the first embodiment, a system having a processor and associated memory for detecting block errors in a video sequence having a plurality of frames, has been described. The system comprises of a scene change detection module, a motion detection module, a candidate detection module, and a candidate block verification module. The scene change detection module is configured for detecting a scene change and determining a set of frames corresponding to a single scene. The motion detection module is configured for detecting motion between two consecutive top fields or between two consecutive bottom fields corresponding to the determined set of frames, and is also configured for determining one or more blocks in the top field or bottom field having motion, wherein each block is a matrix of predetermined size containing pixel values. The candidate detection module is configured for determining one or more candidate blocks within the determined top field or bottom field. Initially, the candidate detection module calculates a vertical gradient for the motion area of the current top field as well as the current bottom field. Then, the candidate detection module thresholds the initially calculated vertical gradient using a predefined threshold. The thresholding results into a thresholded image that is further processed using morphological operations for getting regions corresponding to block errors. In an aspect, the morphological operations comprise of a morphological close operation on the frame with a 7×7 mask and then a morphological open operation on the resultant frame using a 7×3 mask. Once the morphological operations are conducted, a pair of corresponding horizontal edges and a pair of corresponding vertical edges are determined for creating a rectangular region. Such a rectangular region created by using the pair of horizontal edges and the pair of vertical edges is a candidate block. Once the candidate blocks have been determined, the candidate block verification module verifies the candidate blocks along with the neighboring blocks for determining the blocks with block error. The candidate block verification module is configured for determining number of intensity transitions in horizontal direction within the candidate blocks. These number of intensity transitions are compared with a first predefined threshold, and if the number of intensity transitions is greater than the first predefined threshold then two separate sub-blocks are created each for even and odd vertical lines of the candidate blocks. Then, the standard deviation for each of the sub-blocks is determined and compared with a second predefined threshold. If the standard deviation for a sub-block is lesser than the second predefined threshold then a transition map for the block is created. In an aspect, the transition map is created by determining the sign changes in the pixels of the block for each row. The number of sign changes within the transition map is further verified and the presence of repeating pattern in the transition map detected by using a FFT pattern detection module.

According to a second embodiment, a processor implemented method for detecting block errors in a video sequence having a plurality of frames has been described. The frame comprises of a plurality of top fields and a plurality of bottom fields. The top fields are the odd numbered horizontal rows and the bottom fields are the even numbered horizontal rows that in combination result into a frame. The method according the first embodiment comprises the steps of:

a. detecting a scene change and determining a set of frames corresponding to a single scene;
b. detecting motion between two consecutive top fields or between two consecutive bottom fields corresponding to the set of frames determined in step a, and determining one or more blocks in the top field or bottom field having motion, wherein each block is a matrix of predetermined size containing pixel values;

c. determining one or more candidate blocks within the top field or bottom field determined in step b, comprising the steps of:
   calculating a vertical gradient for the motion area of the current top field and current bottom field;
   thresholding the vertical gradient using a predefined threshold;
   processing the thresholded image using a morphological operation for getting regions corresponding to block errors;
   determining a corresponding horizontal edge and a corresponding vertical edge for each rectangular region; and
   creating one or more candidate blocks using the horizontal edge and the vertical edge;
d. verifying the candidate blocks DCT statistics for determining the blocks with grid pattern block error, comprising the steps of:
   determining DCT statistics for the candidate blocks and for a predetermined size of neighbouring blocks by calculating a DC component, summation of all AC coefficients, and summation of AC coefficients pertaining to low frequency components;
   comparing the summation of AC coefficients of the candidate block with a predefined threshold;
   comparing the result of division of summation of low frequency components by summation of AC components of the candidate block with a predefined threshold; and
   evaluating each of the neighboring blocks and marking them as high if the summation of its AC components is greater than half of summation of AC components of the candidate block and thereupon determining if the candidate block depicts the behavior of a block error or pattern/edge with respect to neighboring blocks;
e. further, verifying the candidate blocks that are verified for DCT statistics for block variation visibility, that is the candidate blocks are checked for any error visible in the current frame. The verification process comprising the steps of:
   detecting if the block is present in the previous frame by calculating Sum of Absolute Difference of the block in a region of interest in previous frame, number of edges found in that region and structural similarity index for the structural similarity measure in the previous frame; and
   calculating the mean of the block and deviation of each pixel value from the block mean; and calculating the transitions of the deviations;
f. validating the candidate block as an erroneous block if the transitions are greater than a predefined threshold.

A system having a processor and associated memory for detecting block errors in a video sequence having a plurality of frames, has also been described according to the second embodiment. The system comprises of a scene change detection module, a motion detection module, a candidate detection module, a candidate block verification module, a block variation visibility verification module and an error report generation module. The scene change detection module is configured for detecting a scene change and determining a set of frames corresponding to a single scene. The motion detection module is configured for detecting motion between two consecutive top fields or between two consecutive bottom fields corresponding to the determined set of frames, and is also configured for determining one or more blocks in the top field or bottom field having motion, wherein each block is a matrix of predetermined size containing pixel. The candidate detection module is configured for determining one or more candidate blocks within the determined top field or bottom field. Initially, the candidate detection module calculates a vertical gradient for the motion area of the current top field as well as the current bottom field. Then, the candidate detection module thresholds the initially calculated vertical gradient using a predefined threshold. The thresholding results into a thresholded image that is further processed using morphological operations for getting regions corresponding to block errors. In an aspect, the morphological operations comprise of a morphological close operation on the frame with a 7×7 mask and then a morphological open operation on the resultant frame using a 7×3 mask. Once the morphological operations are conducted, a pair of corresponding horizontal edges and a pair of corresponding vertical edges are determined for creating a rectangular region. Such a rectangular region created by using the pair of horizontal edges and the pair of vertical edges is a candidate block. Once the candidate blocks have been determined, the candidate block verification module verifies the candidate blocks along with the neighboring blocks for determining the blocks with block error. The candidate block verification module is configured for verifying the candidate blocks DCT statistics for determining the blocks with grid pattern block error. The candidate block verification module is configured for: determining DCT statistics for the candidate blocks and for a predetermined size of neighbouring blocks by calculating a DC component, summation of all AC coefficients, and summation of AC coefficients pertaining to low frequency components. Upon calculating the DCT statistics, the candidate block verification module compares the summation of AC coefficients of the candidate block with a predefined threshold, compares the result of division of summation of low frequency components by summation of AC components of the candidate block with a predefined threshold. Each of the neighboring blocks is evaluated and is marked as high if the summation of its AC components is greater than half of summation of AC components of the candidate block. Thereupon, if the candidate block depicts the behavior of a block error or pattern/edge with respect to neighboring blocks then the candidate block is further verified for block variation visibility. Block variation visibility is the verification of the candidate blocks for determining if any error is visible in the current frame. The block variation visibility verification module is configured for: detecting if the block is present in the previous frame by calculating Sum of Absolute Difference of the block in a region of interest in previous frame, number of edges found in that region and structural similarity index for the structural similarity measure in the previous frame. The block variation visibility verification module is adapted for calculating the mean of the block and deviation of each pixel value from the block mean; calculating the transitions of the deviations; and validating the candidate block as an erroneous block if the transitions are greater than a predefined threshold.

According to a third embodiment, a processor implemented method for detecting block errors in a video sequence having a plurality of frames has been described. The frame comprises of a plurality of top fields and a plurality of bottom fields. The top fields are the odd numbered horizontal rows and the bottom fields are the even numbered horizontal rows that in combination result into a frame. The method according the first embodiment comprises the steps of:

a. generating block map using a Morphological gradient. A block map contains visible blocks with high frequency bands at error locations. The process of generating such a block map comprising:
   performing open operation on the current top field and bottom field and a close operation on the current top field and bottom field using a 3×1 mask and calculating difference between these processed fields;
b. detecting one or more candidate error blocks in the block map for top field and bottom field, comprising:
   thresholding the pixel values within the block map with a predetermined threshold value for getting pixels within a visibility range;
   performing morphological open operation using a 3×3 mask for getting a closed figure with a continuous pair of horizontal and pair of vertical edges;
   determining pixels placed on a continuous and adjoining horizontal and vertical edges of a predefined range of width and height; and
   determining a candidate block based on the determined pixels;
c. verifying the detected blocks for block error, comprising:
   determining a maximum coefficient out of the absolute values of DCT high frequency AC coefficients for the candidate block and its 8×8 neighbourhood;
   comparing the determined maximum coefficient of the candidate block with the corresponding determined maximum coefficient of neighbouring blocks and comparing the determined maximum coefficient of the candidate block against an experimentally determined threshold;
d. validating the candidate block as an erroneous block if the maximum coefficient of the candidate block is higher than the experimentally determined threshold and is also higher than the maximum coefficient of neighbouring blocks.

In an aspect, each verified candidate block is further validated by searching the verified candidate block in a previous and a next frame using normalized cross correlation over a region of interest in a set of reference frames.

A system having a processor and associated memory for detecting block errors in a video sequence having a plurality of frames, has also been described according to the third embodiment. The system comprises of block map generation module, a block error detection module, a block error verification module, and an error report generation module. The block map generation module configured for generating block map using a Morphological gradient, comprising: performing open operation on the current top field and bottom field and a close operation on the current top field and bottom field using a 3×1 mask and calculating difference between these processed fields. The block error detection module configured for detecting one or more candidate error blocks in the block map for top field and bottom field, comprising: thresholding the pixel values within the block map with a predetermined threshold value for getting pixels within a visibility range; performing morphological open operation using a 3×3 mask for getting a closed figure with a continuous pair of horizontal and pair of vertical edges; determining pixels placed on a continuous and adjoining horizontal and vertical edges of a predefined range of width and height; and storing the determined pixels locations as candidate blocks. The block error verification module configured for verifying the detected blocks for block error, the block error verification module being configure for: determining a maximum coefficient out of the absolute values of DCT's high frequency AC coefficients for the candidate block and its 8×8 neighborhood; comparing the determined maximum coefficient of the candidate block with the corresponding determined maximum coefficient of neighboring blocks and comparing the determined maximum coefficient of the candidate block against an experimentally determined threshold; verifying the candidate block as an erroneous block if the maximum coefficient of the candidate block is higher than the experimentally determined threshold and is also higher than the maximum coefficient of neighboring blocks.

In an aspect, the system further comprises of a block validation module for validating the verified candidate block by searching the verified candidate block in a previous and a next frame using normalized cross correlation over a region of interest in a set of reference frames.

Further objects, advantages and novel features of the present invention are apparent from the following detailed description when read in conjunction with the appended claims and attached drawing.

BRIEF DESCRIPTION OF THE DRAWINGS

FIG. 2 is a flowchart describing a method for detecting grid pattern or checkerboard type block errors in a frame of a video sequence, according to a first embodiment.

FIG. 3 is a flowchart describing a step of detecting candidate blocks, according to the first embodiment.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
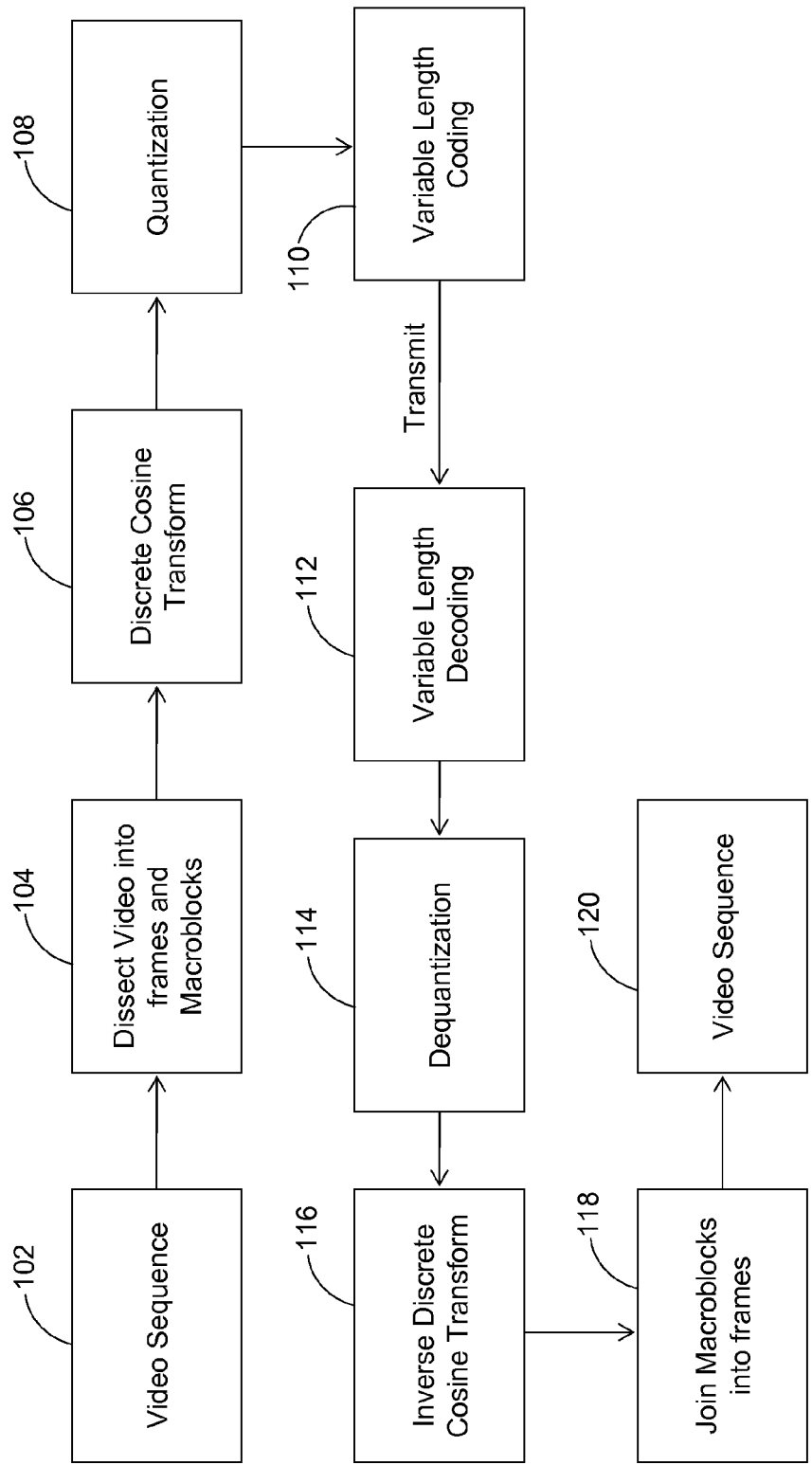
FIG. 1 illustrates various phases involved in transmitting a video sequence.

A digital video stream is formed by sampling and quantizing analog picture information and transforming the generated data into continuous bitstreams. The digitized signal allows the use of advanced digital signal processing tools, which permit faster and more efficient data transfer. Several video-coding algorithms have recently been developed to reduce the number of bits necessary for representation and correspondingly reduce the bit-rates required for transmission of digital video stream. FIG. 1 illustrates the basic stages of video encoding and decoding used in various standards and generally known to a person skilled in the art. The video stream is first dissected (104) into various frames and then to various macroblocks. Each macroblock comprises of a matrix of pixels having a pixel value. The pixel value for example in YUV space includes one luminance (Y) and two chrominance (U, V) components. Each macroblock may include 8×8 pixels. The pixel values in each macroblock are transformed (106) into the spatial-frequency domain using the Discrete Cosine Transform (DCT). The derived DCT matrix is then quantized (108) and the quantized signal is coded (110) using a table of Variable Length Codewords (VLC). During quantization, the less required frequencies, or the less prominent patterns can be disregarded, and hence almost the similar representation of the block is achieved. Such a coded signal is then transmitted to a receiver. At the receiving end the inverse processes (112, 114, and 116) are implemented in a reverse order to reconstruct each frame. The received frames are then collated to receive the video sequence at the receiver. During transmission the video sequence may be introduced to certain noise signals that may corrupt one or more significant bits in the macroblock. The corrupted significant bit corrupts the information inside the macroblock while decoding of the video frame. Due to such a corrupted macroblock, taking inverse of the DCT transform results into absurd patterns in the macroblock and hence causing perceivable corrupted blocks that are called block errors.

FIG. 2 is a flowchart diagram illustrating a generic method (200) for detecting block error in a video sequence containing a plurality of frames, according to a first embodiment. Initially, the YUV data related to each frame of the video sequence is extracted. In an embodiment, the YUV data related to a current frame and a previous frame are extracted (202). Upon extracting the YUV data of the current frame, the current frame is detected whether it is the beginning of a new scene (204) by means of the scene change detection module. The scene change is detected based on the comparison of the histograms of the previous frame and the current frame. In an aspect, histogram of the luminance values of previous frame and histogram of the current frame are taken, i.e. the distribution of pixels ranging from 0-255 is mapped into 256 bins where each bin contains the number of times the pixel value corresponding to that bin has found in the frame. A difference is calculated between the histograms and if such a difference is greater than a predetermined threshold (206) then a scene change has occurred. In case, scene change is detected that is the current frame is part of a new scene then the frame is not further processed for detecting block error.

Once it is determined that the current frame is not part of a new scene, the previous frame and the current frame are processed to determine a region (208) where motion has occurred or the regions where new objects have been introduced into the current frame. Such a region provides a region of interest (ROI) that is a map of the blocks where motion has occurred, and where further processing is confined. In case, no motion is found as in the case of freeze frames, or very low motion, the frame is not processed further for error detection. In an aspect, for determining a region of interest an absolute difference between the current and previous frames is calculated. These differences are summed up over a 8×8, non-overlapping window and if the sum exceeds a threshold (set according to experiments), that window block and its 4 neighbourhood blocks (of that same window size) are marked set as region having motion. This is done over the whole frame, for all the windows so formed, and the complete frame is marked for motion region and non motion region.

Upon determining the region of interest in a frame, block error is detected (210) based on block error properties. The block error detection step provides one or more candidate blocks that may have a block error.

The candidate blocks are then verified (212) for ascertaining block error on the basis of the patterns formed inside the candidate block and its distinction from the surrounding blocks spatially and/or temporally.

FIG. 3 is a flowchart describing a step of detecting candidate blocks (210), according to the first embodiment. The method (300) describes a method for determining one or more candidate blocks within the top field or bottom field in the region of interest i.e. the blocks having motion. At step (302) a vertical gradient is calculated for the motion area of the current top field and current bottom field. Thereupon the image with the vertical gradient is thresholded (304) using a predefined threshold. The thresholded image is then processed at step (306) using morphological operations to get vertical edges in that region. The morphological operation includes a morphological Open operation and morphological Close operation using masks designed specifically for handling checkerboard pattern/grid pattern in the errors. The morphological operation comprises of firstly a close operation on the image with a 7×7 mask and then an Open operation on the image so obtained by using a 7×3 mask. This converts the vertical bands in the gradient image into a block figure.

Over such a map of blocks, vertical edges are looked for and stored in a data structure as a line. Similarly, horizontal edges are detected and stored. Vertical edges and horizontal edges are produced by simple difference operation on the block image in horizontal direction and vertical direction. The corresponding horizontal edge and a corresponding vertical edge is determined (308) for each rectangular region. A pair of horizontal edge and vertical edge is determined for creating a closed figure for getting the blocks that may have error. At step (310) one or more candidate blocks are created using the horizontal edge and the vertical edge.

Figure 4A:
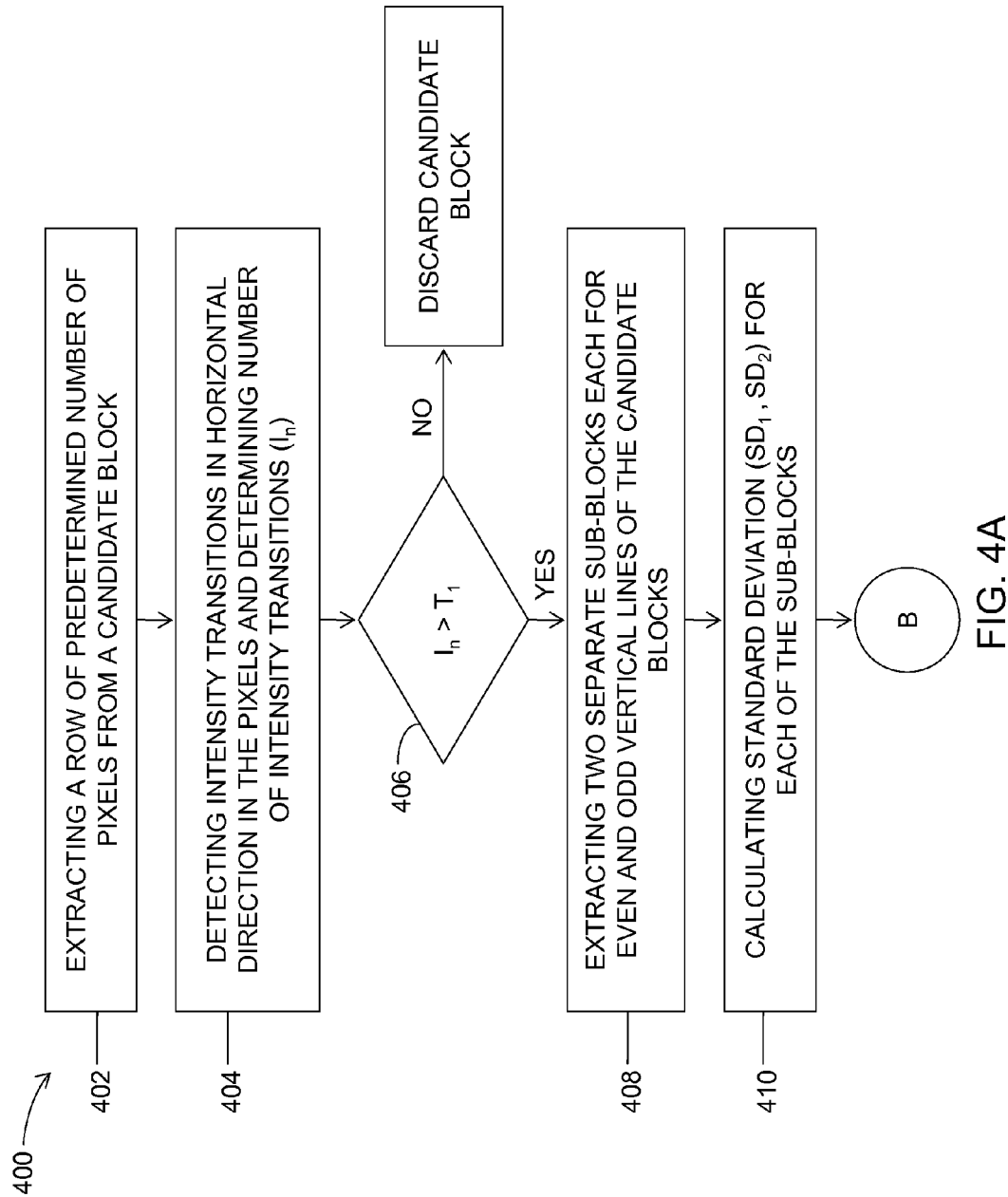
FIGS. 4a and 4b is a flowchart describing a step of verifying candidate blocks, according to the first embodiment.
Figure 4B:
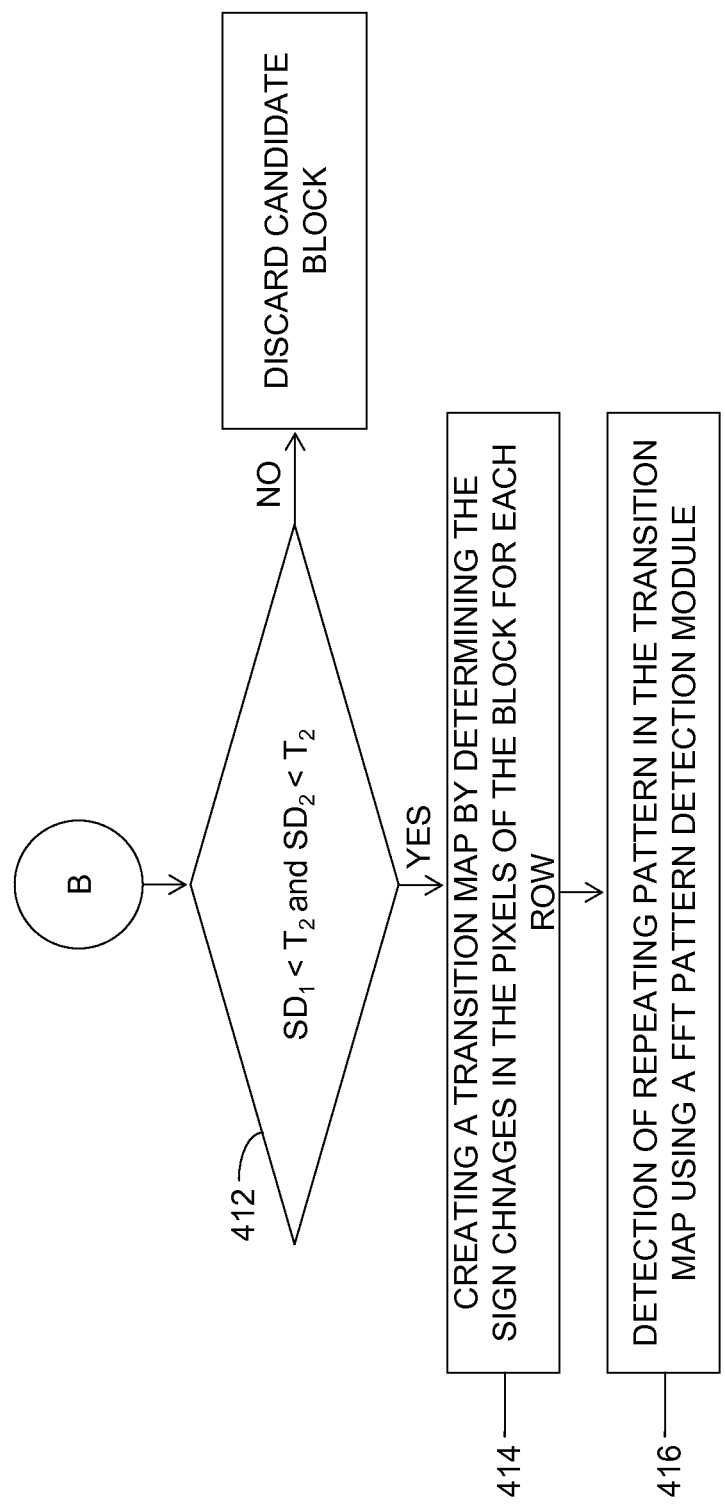

FIGS. 4a and 4b describe a flowchart of the step of verifying candidate blocks (212), according to the first embodiment. The candidate block may be a matrix of pixels having a predetermined size. A predetermined set of pixels are extracted (402) from each row of the candidate block for verification. In an aspect, a set of 6 pixels is extracted from each row for further processing. At step (404) the intensity transitions in horizontal direction in the pixels is detected and the number of intensity transitions in horizontal direction within the candidate blocks is determined. The number of intensity transitions are then compared (406) with a first predefined threshold ($T_1$). In case the number of intensity transitions is greater than the first predefined ($T_1$) then two separate sub-blocks each for even and odd vertical lines of the candidate blocks are extracted (408). The standard deviation ($SD_1$ and $SD_2$) for each of the sub-blocks is then determined. Thereafter, the standard deviation for each of the sub-blocks ($SD_1$ and $SD_2$) is individually is compared (412) with a second predefined threshold ($T_2$). In case, the standard deviation for each of the sub-blocks (SD1 and SD2) is lesser than the second predefined threshold (T2), then it signifies that the high intensity region and low intensity region do not have a high standard deviation. Since the number of intensity transitions is also high, it indicates the presence of a potential block having high frequency bands. To verify high frequency pattern in the block, a transition map or a transition buffer for the block is created (414). In an aspect, the transition map is created by determining the sign changes in the pixels of the block for each row. The sign change in the pixels in each horizontal row of the transition map is evaluated and the pixels having the sign change are determined (416). The number of sign changes within the transition map is also verified. Finally, the presence of repeating pattern in the transition map is detected (418) using a FFT pattern detection module.

Figure 5:
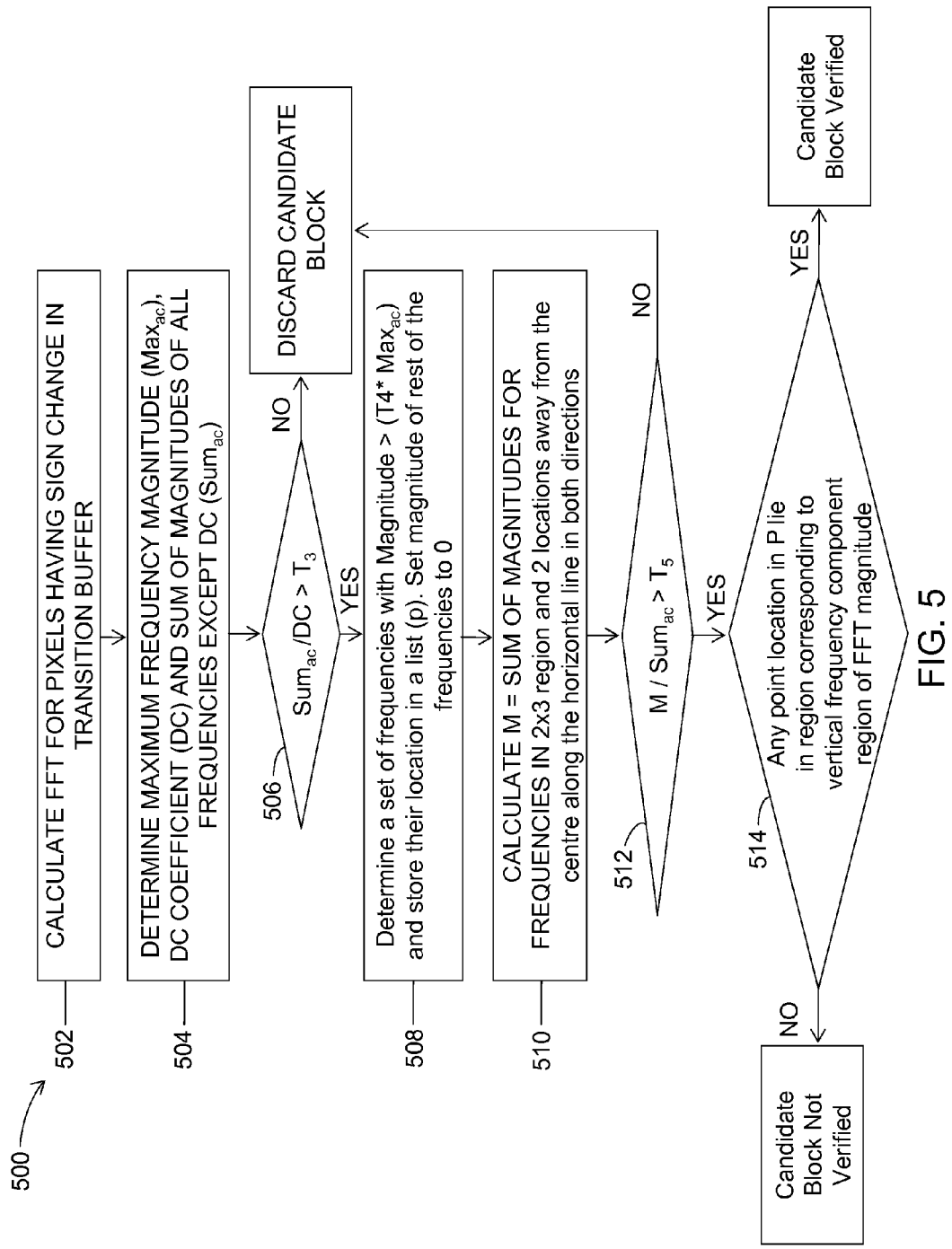
FIG. 5 is a flowchart describing the step of detecting presence of repeating pattern in the transition map, according to the first embodiment.

FIG. 5 is a flowchart describing the step of detecting presence of one or more repeating patterns in the transition map as determined in FIG. 4. The transition map contains sign change values corresponding to the pixels having transitions from high to low to high. The transitions may be calculated by comparing the pixel values of a pixel with the corresponding pixel values of the previous pixel and the next pixel in the row. Moreover in the transition map, location corresponding to high intensity changes, change of sign of intensity variation and no significant intensity change within the candidate block are marked accordingly. The presence of repeating pattern in the transition map is detected by using a Fast Fourier Transform pattern detection module. In step (502), the FFT for pixels having sign change in the transition buffer is calculated. A Fast Fourier Transform (FFT) results into a real and an imaginary part through which the magnitude and phase of the transformation may be calculated. For repeating pattern detection, the magnitude of the FFT of the pixels is considered, since the magnitude tells how much of a certain frequency component is present in an image. In step (504), the DC coefficient (DC), sum of all frequencies except DC ($Sum_{ac}$), and the maximum amongst the ac frequencies i.e. the Maximum Frequency component ($Max_{ac}$) are calculated for establishing a presence of peak/significant frequency component lying in the horizontal axis in the FFT magnitude. At step (506), the ratio of Maximum Frequency component ($Max_{ac}$) with the sum of all frequencies except DC ($Sum_{ac}$) is calculated and compared with a predetermined threshold (T3). In case the ratio for a particular candidate block is greater than T3 then the block is processed further, otherwise the candidate block is discarded. Thereupon, a set of frequencies is determined at step (508) and their locations are stored in a list (P). The set of frequencies are determined such that the frequencies have magnitude greater than a certain percentage of the AC, or in other words the frequencies greater than (T4*AC) constitute the set and are further considered otherwise the value of the pixel is set zero. At step (510), the magnitude near horizontal line around the intended frequency pattern (M) is calculated which is equal to the sum of magnitudes for all the frequencies present in a 2×3 region wherein the region includes 2 locations away from the centre along the horizontal line in both directions. Then the ratio of this the magnitude near horizontal line around the intended frequency pattern (M) with sum of all frequencies except DC ($Sum_{ac}$) is compared with a predetermined threshold (T5). If this ratio is greater than T5 then the block is further processed, otherwise rejected. At step (514), all the points in the set of stored locations in the list (P) is checked if they lie in the region corresponding to vertical frequency component region of the FFT magnitude, in case any point lies in this region then the candidate block is verified for having repeating pattern.

Figure 6:
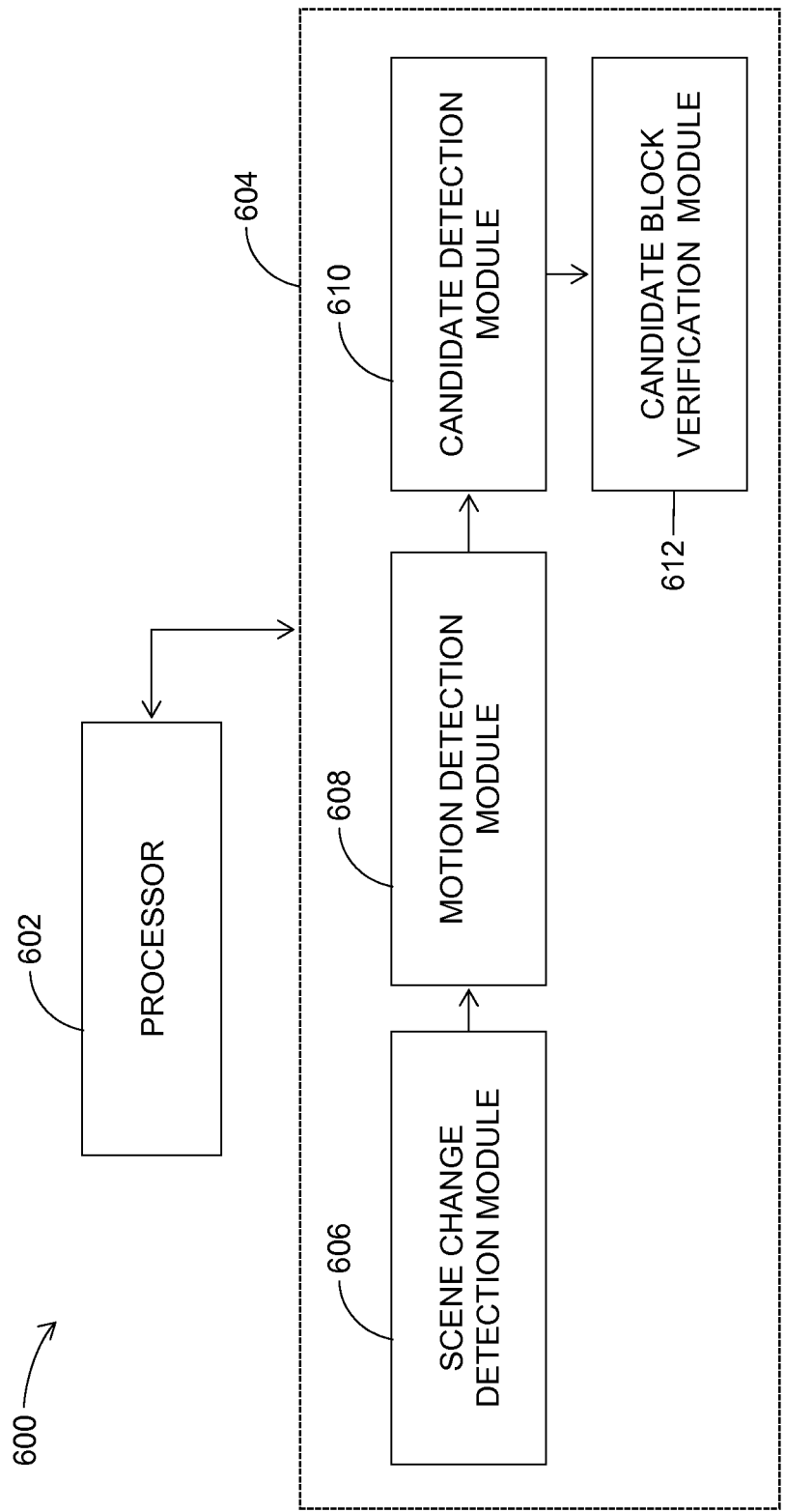
FIG. 6 is a block diagram of system for detecting grid pattern or checkerboard type block errors in a frame of a video sequence, according to a second embodiment.

FIG. 6 depicts a block diagram of system for detecting grid pattern or checkerboard type block errors in a frame of a video sequence, according to a second embodiment. The system (600) has at least a processor (602) and associated memory (604) containing one or more modules for detecting block errors in a video sequence. The processor is enabled to access the memory and execute the various modules stored in the memory. The system comprises of a scene change detection module (606), a motion detection module (608), a candidate detection module (610), a candidate block verification module (612).

The scene change detection module (606) is configured for detecting a scene change and determining a set of frames corresponding to a single scene.

The motion detection module (608) is configured for detecting motion between two consecutive top fields or between two consecutive bottom fields corresponding to the set of frames corresponding to a single scene as detected by the scene change detection module (606). The motion detection module (608) is also configured for determining one or more blocks in the top field or bottom field having motion.

The candidate detection module (610) is configured for determining one or more candidate blocks within the determined top field or bottom field. The candidate detection module (610) is configured for calculating a vertical gradient for the motion area of the current top field and current bottom field. The candidate detection module (610) also enables thresholding the image with a vertical gradient using a predefined threshold. Once the thresholded image is determined the candidate detection module (610) processes the thresholded image using a morphological close operation and then processes it with a morphological open operation for getting regions corresponding to block errors. Further, the candidate detection module (610) also determines a corresponding horizontal edge and a corresponding vertical edge for each rectangular region and thereafter creates one or more candidate blocks using the horizontal edge and the vertical edge.

The candidate block verification module (612) configured for verifying the candidate blocks for determining the blocks with block error, wherein the candidate block verification module is configured for determining the number of intensity transitions in horizontal direction within the candidate blocks and comparing the number of transitions with a first predefined threshold. In case, the number of intensity transitions is greater than the first predefined threshold then the candidate block verification module (612) enables getting two separate sub-blocks each for even and odd vertical lines of the candidate blocks. The candidate block verification module is also configured for determining standard deviation for each of the sub-blocks and comparing the standard deviation for each of the sub-blocks with a second predefined threshold. In case, the standard deviation is lesser than the second predefined threshold then a transition map for the block is created by the candidate block verification module (612). The sign changes in the pixels within the transition map are then verified and presence of repeating pattern in the transition map using a FFT pattern detection module is detected by the candidate block verification module (612).

Figure 7A:
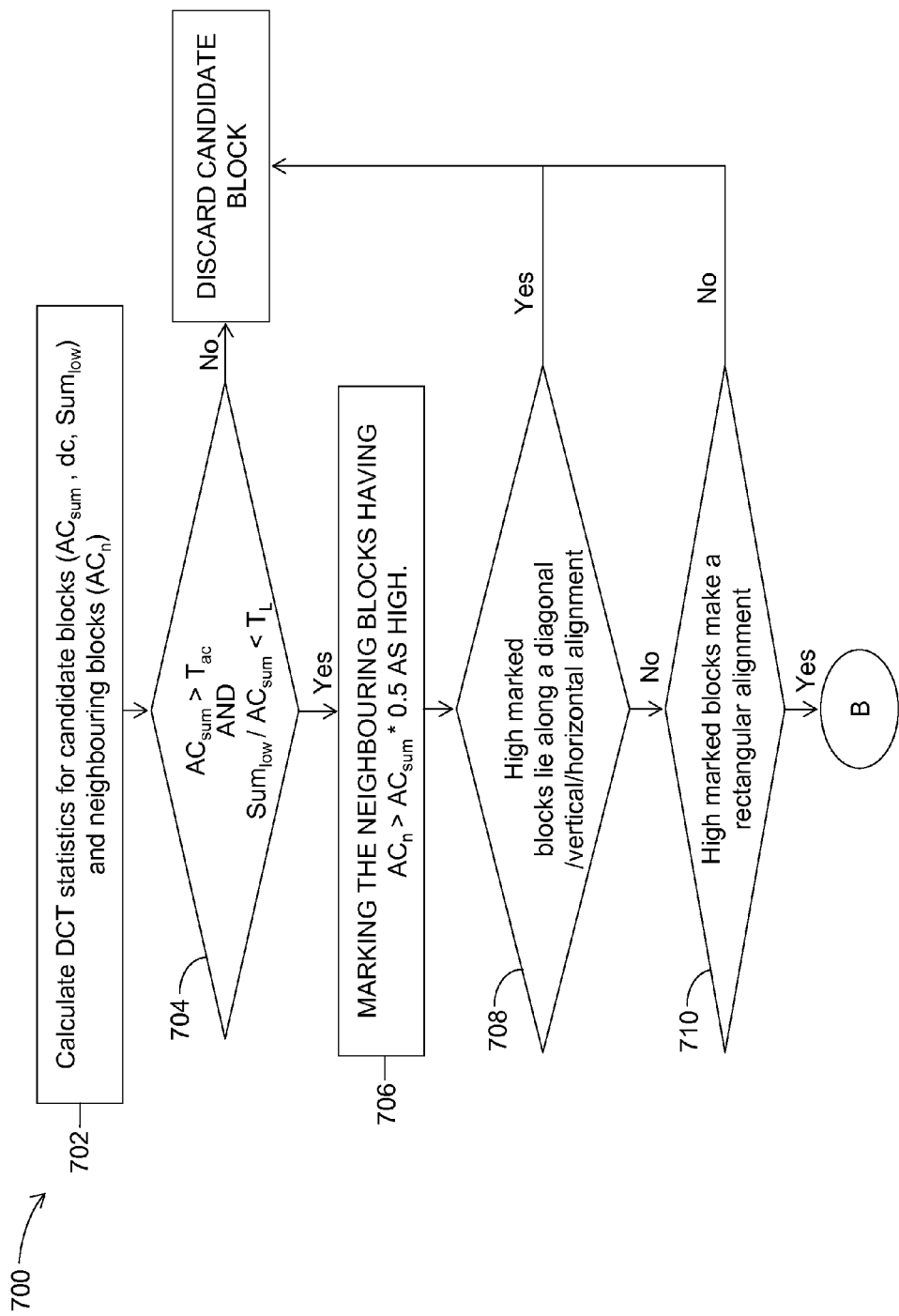
FIGS. 7a and 7b depict a flowchart describing a step of verifying candidate blocks, according to the second embodiment.
Figure 7B:
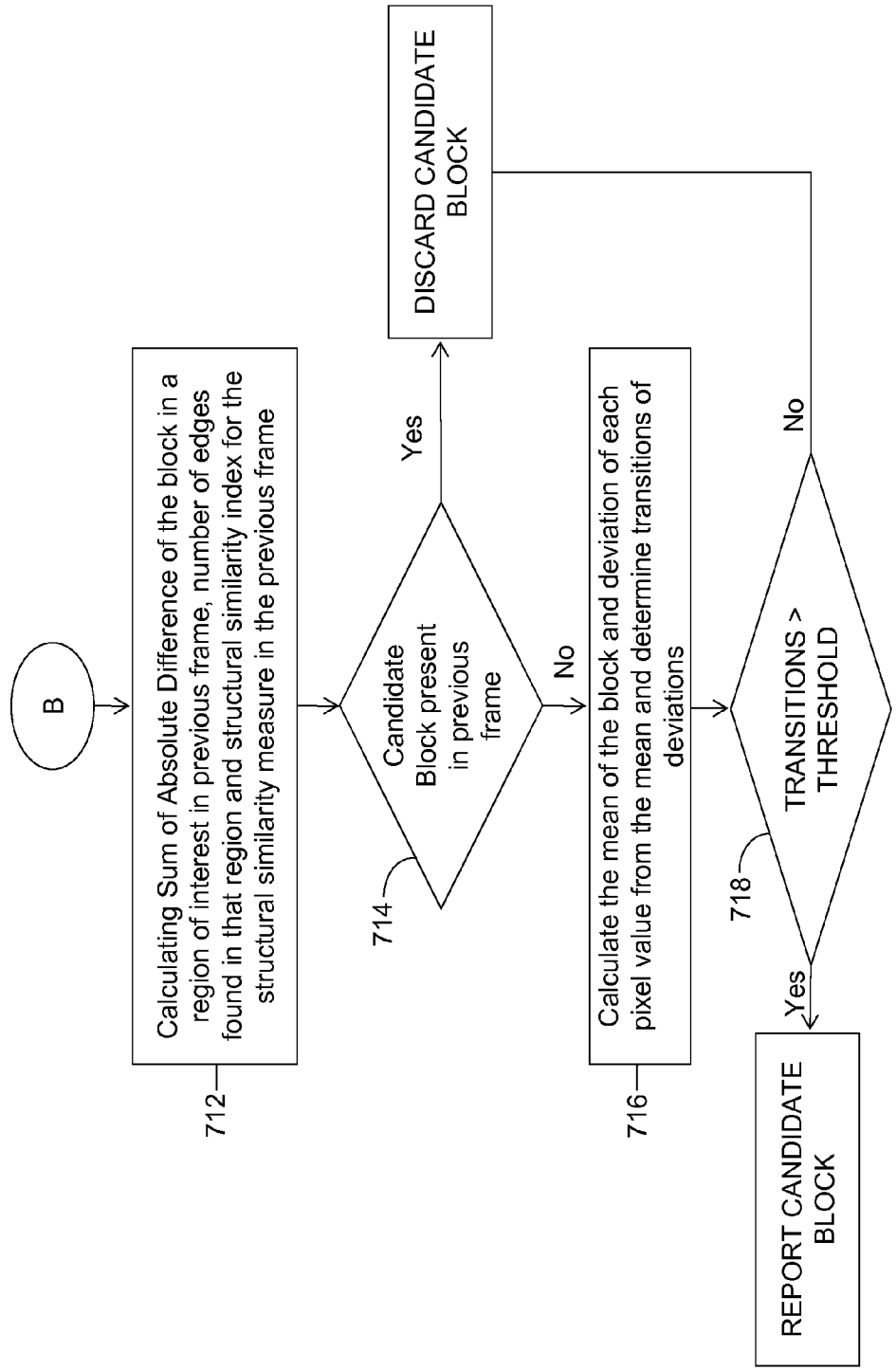

FIGS. 7a and 7b depict a flowchart describing a step of verifying candidate blocks, according to the second embodiment. The second embodiment describes another method for verifying the candidate blocks detected according the first embodiment. In step (702) the DCT statistics for the candidate blocks and for a predetermined size of neighbouring blocks is calculated. Specifically, the DC component (dc), summation of AC coefficients ($AC_{sum}$), and summation of low frequency components ($Sum_{low}$) of the candidate block are determined, and the summation of AC coefficients of the neighbouring blocks ($AC_n$) is calculated. Then at step (704), the summation of AC coefficients of the candidate block is compared with a predefined threshold ($T_{ac}$). A ratio of summation of low frequency components to summation of AC components of the candidate block is also calculated and then compared with a predefined threshold ($T_L$). In case at step (704), the summation of AC coefficients of the candidate block is greater than the predefined threshold ($T_{ac}$) and also if the ratio of summation of low frequency components to summation of AC components of the candidate block is smaller than the predefined threshold ($T_L$) then the step (706) is processed, otherwise the block is discarded.

At step (706), the neighboring blocks are analyzed and are set high if the summation of AC components of the neighboring block is greater than (summation of AC components of the candidate block*0.5). Based on the alignment of the neighboring blocks which are set as high, the block error candidate is processed further, else is rejected. At step (708), if the neighboring blocks that are set high lie in a vertical, horizontal or diagonal line alignment, then the candidate error block is discarded. At step (710), if the candidate block and neighboring blocks are set as high such that they together form a block alignment or a rectangular alignment, then the candidate block proceeds for further verification. The verification process starts at step (712) by calculating Sum of Absolute Difference of the block in a region of interest in previous frame, number of edges found in that region and calculating the structural similarity index for the structural similarity measure in the previous frame. At step (714), the previous frame is analyzed and the presence of the shortlisted candidate block is determined in the previous frame by utilizing the Sum of Absolute Difference of the block in a region of interest in previous frame, number of edges found in that region and the structural similarity index for the structural similarity measure in the previous frame. At step (716) the mean of the block and deviation of each pixel value from the block mean is calculated along with the number of deviations or transitions present in the block. The number of deviations/transitions is compared with a predefined threshold at step (718), if the transitions is greater than the threshold then the candidate block is verified as an erroneous block.

Figure 8:
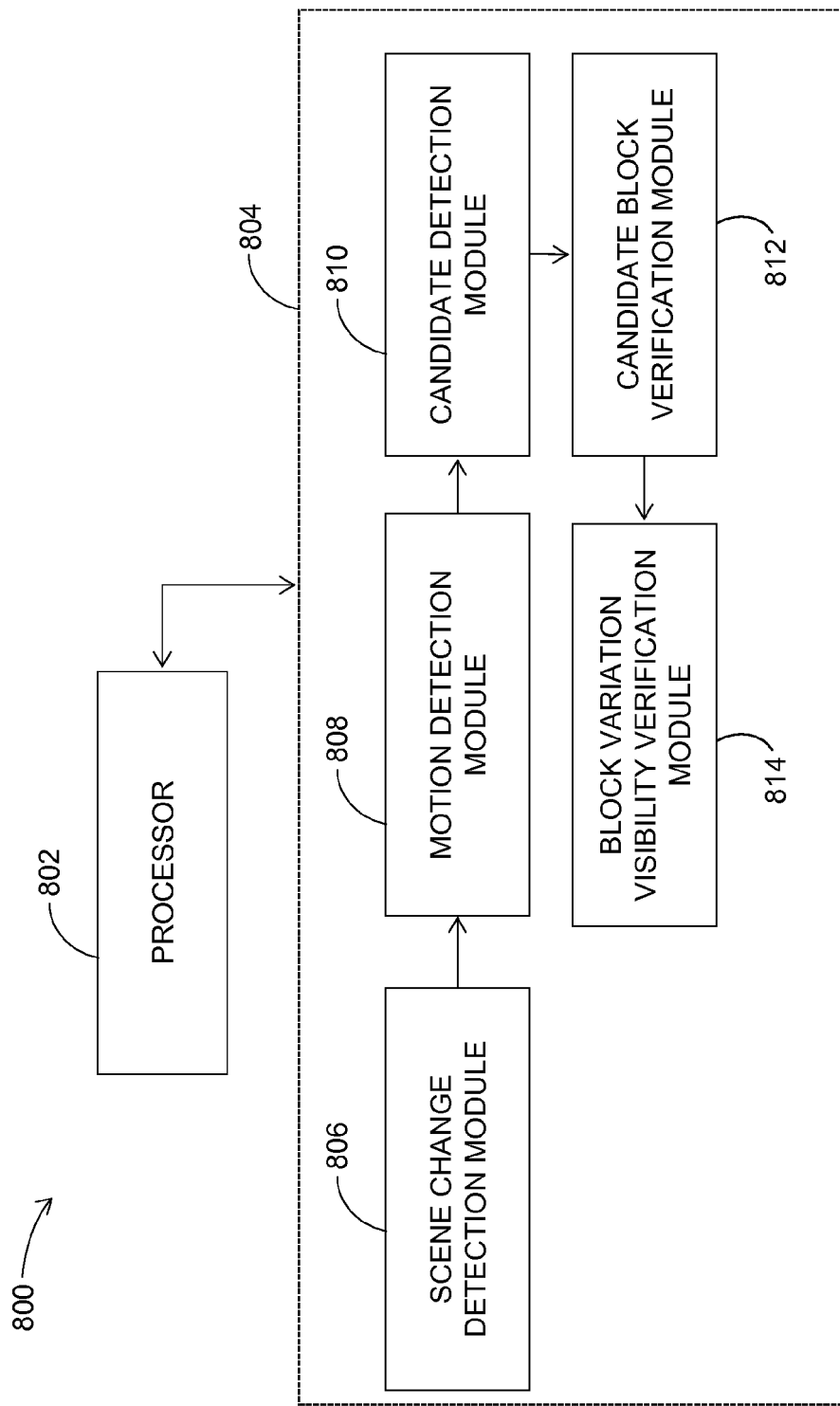
FIG. 8 is a block diagram of system for detecting grid pattern or checkerboard type block errors in a frame of a video sequence, according to the second embodiment.

FIG. 8 is a block diagram of system for detecting grid pattern or checkerboard type block errors in a frame of a video sequence, according to the second embodiment. The system (800) has at least a processor (802) and associated memory (804) containing one or more modules for detecting block errors in a video sequence. The processor is enabled to access the memory and execute the various modules stored in the memory. The system comprises of a scene change detection module (806), a motion detection module (808), a candidate detection module (810), a candidate block verification module (812), a block variation visibility verification module (814).

The scene change detection module (806) is configured for detecting a scene change and determining a set of frames corresponding to a single scene.

The motion detection module (808) is configured for detecting motion between two consecutive top fields or between two consecutive bottom fields corresponding to the set of frames corresponding to a single scene as detected by the scene change detection module (806). The motion detection module (808) is also configured for determining one or more blocks in the top field or bottom field having motion.

The candidate detection module (810) is configured for determining one or more candidate blocks within the determined top field or bottom field. The candidate detection module (810) is configured for calculating a vertical gradient for the motion area of the current top field and current bottom field. The candidate detection module (810) also enables thresholding the vertical gradient using a predefined threshold. Once the thresholded image is received the candidate detection module (810) is processed using a morphological close operation and then processing it with a morphological open operation for getting regions corresponding to block errors. Further, the candidate detection module (810) also determines a corresponding horizontal edge and a corresponding vertical edge for each rectangular region and thereafter creates one or more candidate blocks using the horizontal edge and the vertical edge.

The candidate block verification module (812) is configured for verifying the DCT statistics of the candidate blocks for determining the blocks with grid pattern block error. The candidate block verification module (812) is particularly configured for determining DCT statistics for the candidate blocks and also the DCT statistics for a predetermined size of neighboring blocks. The DCT statistics is calculated by operating each candidate block by a DCT transformation. In a DCT transform of an N×M block, each DCT coefficient is a linear combination of all pixel values within the block. There may be a relationship between the pixel values and its DCT coefficients such as the DC coefficient represents the average energy of the block. In an aspect, the value of each AC coefficient reflects the variation in gray level values in certain directions at a certain rate. The DCT coefficient block can then be divided into regions of high, medium and low frequencies region, and also into vertical, horizontal and diagonal components of the blocks. In an aspect, the DCT statistics comprise of a DC component, summation of AC coefficients, and summation of low frequency components. These DCT statistics are calculated for all the candidate blocks, along with the same sized blocks in its 5×5 neighborhood.

The candidate block verification module (812) upon calculating the DCT statistics compares the summation of AC coefficients of the candidate block with a predefined threshold ($T_{ac}$). The result of division of summation of low frequency components by summation of AC components of the candidate block is compared with a predefined threshold ($T_L$). In case, the summation of AC coefficients of the candidate block is greater than the predefined threshold ($T_{ac}$) and the result of division of summation of low frequency components by summation of AC components of the candidate block is smaller than the predefined threshold ($T_L$), then the DCT statistics of candidate block is compared with the DCT statistics of its neighboring blocks. For each of the block in the predefined neighborhood of candidate block, if the summation of AC components of the neighboring block is greater than half of the summation of AC components of the central candidate block, those neighboring block are marked as high. Based on the alignment of the neighbouring blocks which are set as high, the block error candidate is processed further, else is rejected. If the neighbouring blocks are set high in a vertical, horizontal or diagonal line alignment, the candidate error block is not processed. If the candidate block and neighbouring blocks are set as high such that they together form a block alignment, the candidate blocks proceeds for further verification.

The blocks are further verified for block variation visibility that is the previously verified is checked if the error is visible enough in the current frame. The block is firstly searched for in the previous frame for determining if the block is an artefact from the previous frame. In case, the block is not present in the previous frame only then it is further processed for block variation visibility. The block is verified for its presence in the previous frame by calculating Sum of Absolute Difference of the block in a region of interest in the previous frame, number of edges found in that region and structural similarity measure (SSIM) in the previous frame. Then a mean of the block is calculated for the blocks that are not present in the previous frame. Further, the deviation of each pixel from the block mean is determined and stored for determining the number of transitions in the complete block. Such number of transitions is then compared with a predefined threshold and if the number of transitions is greater than the threshold then the block is reported as having error.

In the present embodiment, a block variation visibility verification module (814) for verifying for visibility of variations in the block due to error is also provided. The block variation visibility verification module (814) is configured for detecting the presence of the candidate block in the previous frame by calculating Sum of Absolute Difference of the block in a region of interest in previous frame, number of edges found in that region and structural similarity index for the structural similarity measure in the previous frame. Further, the block variation visibility verification module (814) calculates the mean of the block and deviation of each pixel value from the block mean and also calculates the transitions of the deviations. The transitions of deviations are compared with the height of the block if the transitions are greater than predefined threshold then the candidate block is verified as an erroneous block by the error report generation module.

Figure 9:
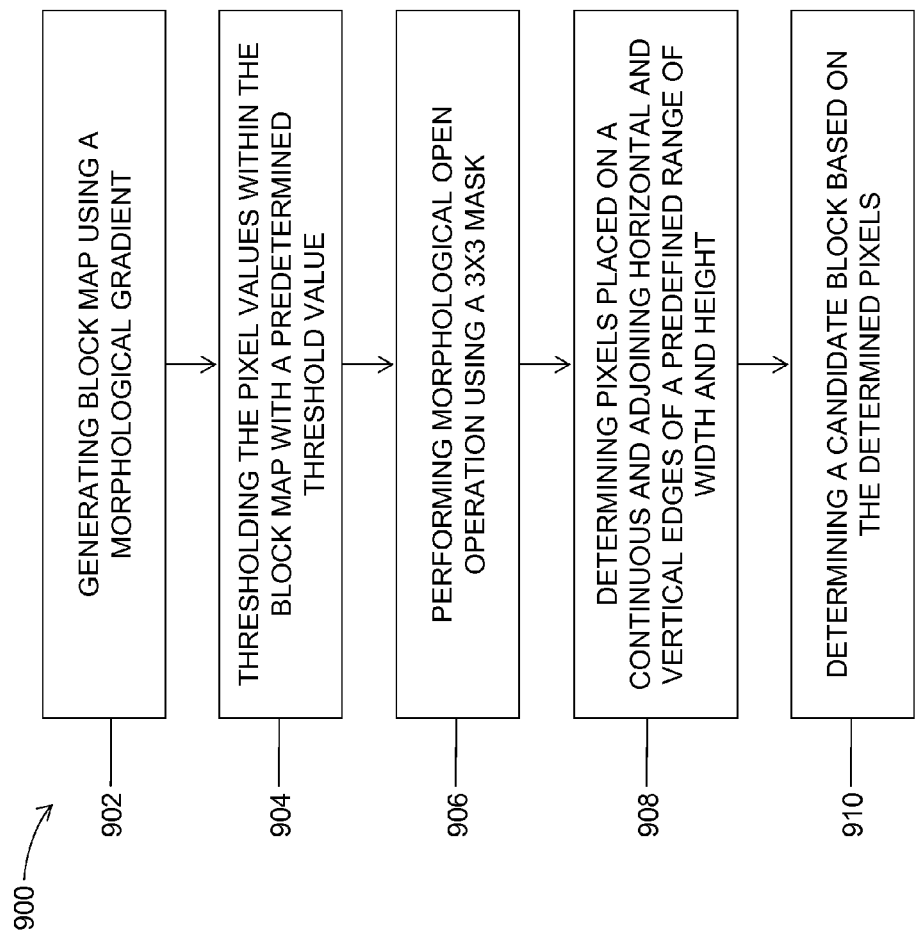
FIG. 9 is a flowchart for detecting vertical pattern type block errors in a frame of a video sequence, according to a third embodiment.
Figure 10:
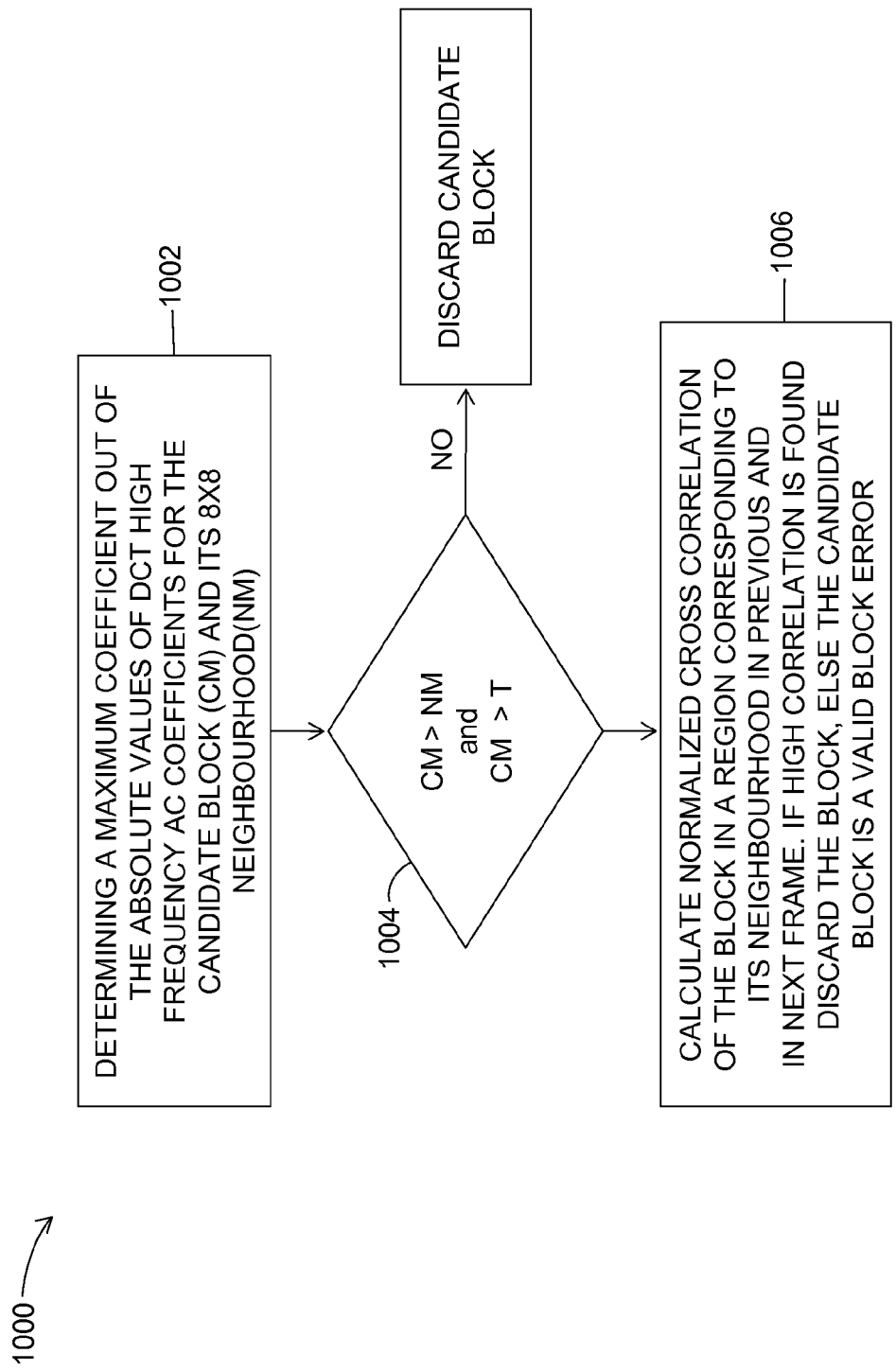
FIG. 10 is a flowchart describing a step of verifying candidate blocks, according to the third embodiment.

FIG. 9 is a flowchart for detecting vertical pattern type block errors in a frame of a video sequence, according to a third embodiment. The processor implemented method for identifying vertical pattern block errors comprises of two sub methods namely a method for detecting blocks containing block errors and a method for verifying the detected blocks for block error. The method (900) as illustrated in FIG. 9 describes detecting blocks containing errors in a decoded frame of video sequence. The method starts with generating (902) block map using a Morphological gradient by performing open operation on the current top field and bottom field and a close operation on the current top field and bottom field using a 3×1 mask and calculating difference between these processed fields. Thereafter, one or more candidate error blocks are detected in the block map for top field and bottom field. The candidate error blocks are detected by thresholding (904) the pixel values within the block map with a predetermined threshold value for getting pixels within a visibility range. Further, a morphological open operation (906) is performed using a 3×3 mask for getting a closed figure with a continuous pair of horizontal and pair of vertical edges. One or more pixels are then determined (908) that are placed on a continuous and adjoining horizontal and vertical edges of a predefined range of width and height. Finally a candidate block is determined (910) based on the determined pixels;

FIG. 10 is a flowchart describing a step of verifying candidate blocks, according to the third embodiment. The method starts with determining (1002) a maximum coefficient out of the absolute values of DCT high frequency AC coefficients corresponding to vertical component of variations for the candidate block and its 8×8 neighborhood. The determined maximum coefficient of the candidate block (CM) is then compared (1004) with the corresponding determined maximum coefficient (NM) of neighboring blocks and the determined maximum coefficient (CM) of the candidate block is compared against an experimentally determined threshold (T). In case, the maximum coefficient of the candidate block (CM) is higher than the experimentally determined threshold (T) and is also higher than the maximum coefficient of neighboring blocks (NM) then step (1006) is executed otherwise the block is discarded. At step (1006), the normalized cross correlation of the block in a region corresponding to its neighbourhood in previous and in next frame is calculated. In case, the correlation is high correlation, the block is discarded; else the candidate block is verified as a valid block error.

In an aspect, the method further comprises validating the verified candidate block by searching the verified candidate block in a previous and a next frame using normalized cross correlation over a region of interest in a set of reference frames.

Figure 11:
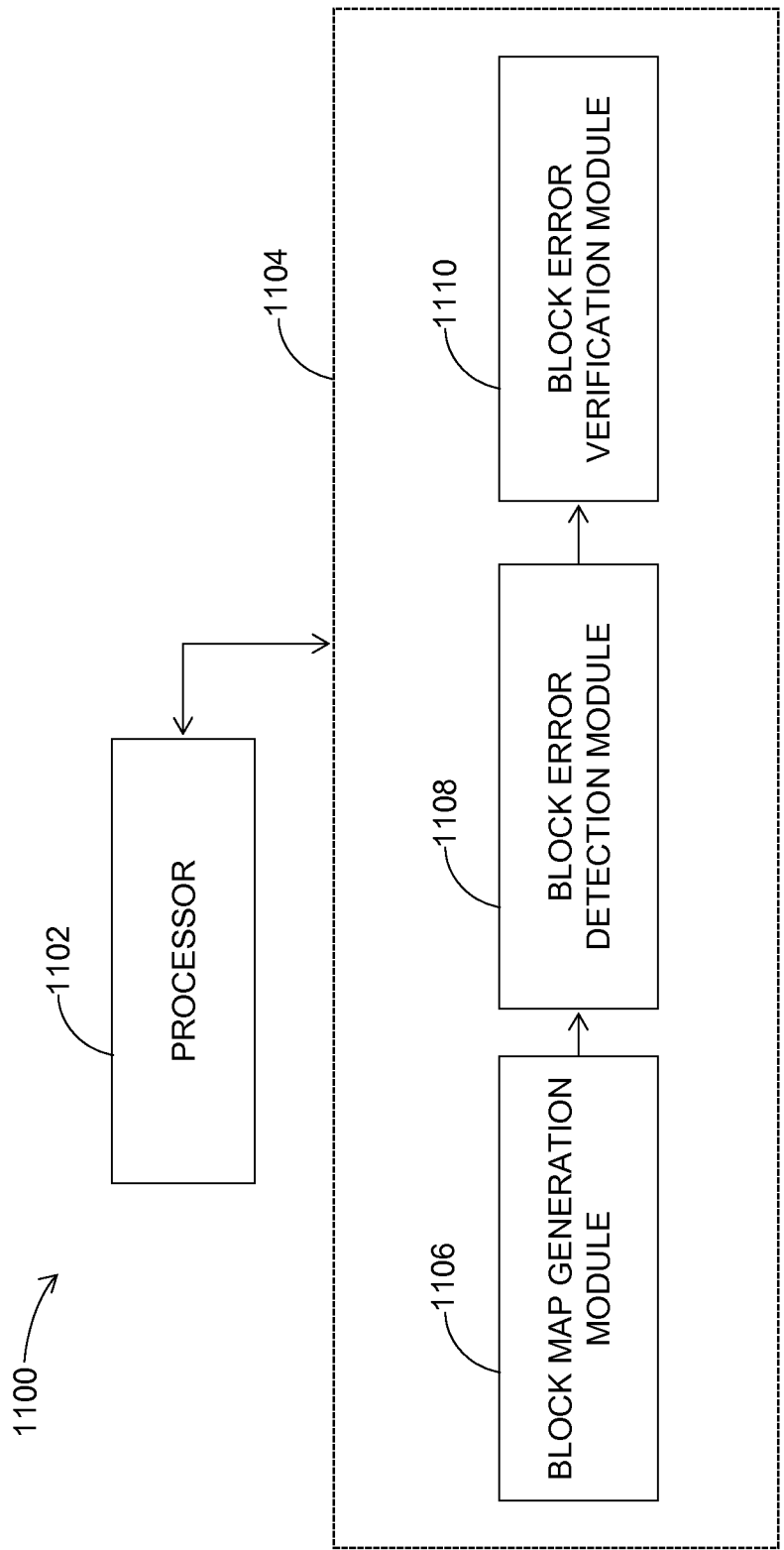
FIG. 11 is a block diagram of system for detecting vertical pattern type block errors in a frame of a video sequence, according to the third embodiment.

FIG. 11 is a block diagram of system for detecting vertical pattern type block errors in a frame of a video sequence, according to the third embodiment. The system (1100) comprises of a processor (1102) and associated memory (1104) for detecting vertical pattern type block errors in a decoded frame of video sequence. The memory (1104) comprises of a plurality of modules that may be executed by the processor (1102). In an aspect, memory (1104) comprises of a block map generation module (1106), a block error detection module (1108), a block error verification module (1110).

The block map generation module (1106) is configured for generating block map using a Morphological gradient. The morphological operation comprises of performing an open operation on the current top field and bottom field and a close operation on the current top field and bottom field using a 3×1 mask and calculating difference between these processed fields.

The block error detection module (1108) is configured for detecting one or more candidate error blocks in the block map for top field and bottom field. The block error detection module (1108) thresholds the pixel values within the block map with a predetermined threshold value for getting pixels within a visibility range. Further, the block error detection module performs a morphological open operation using a 3×3 mask for getting a closed figure with a continuous pair of horizontal and pair of vertical edges. The module also determines the pixels placed on continuous and adjoining horizontal and vertical edges of a predefined range of width and height; and then stores the determined pixels locations for creating one or more candidate blocks.

The block error verification module (1110) configured for verifying the detected blocks for block error. The block error verification module determines a maximum coefficient out of the absolute values of DCT high frequency AC coefficients corresponding to vertical component of variations for the candidate block and its 8×8 neighborhood. Further, the block error verification module (1110) compares the determined maximum coefficient of the candidate block with the corresponding determined maximum coefficient of neighboring blocks and then compares the determined maximum coefficient of the candidate block against an experimentally determined threshold. The block error verification module (1110) further validates the candidate block as an erroneous block if the maximum coefficient of the candidate block is higher than the experimentally determined threshold and if the maximum coefficient of the candidate block is higher than the maximum coefficient of neighboring blocks.

In an aspect the memory (1104) of the system (1100) further comprises of a block validation module for validating the verified candidate block by searching the verified candidate block in a previous and a next frame using normalized cross correlation over a region of interest in a set of reference frames.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A processor implemented method for detecting block errors in a video sequence having a plurality of frames, the frame being composed of a plurality of top fields and a plurality of bottom fields, comprising the steps of:
   a. detecting a scene change and determining a set of frames corresponding to a single scene;
   b. detecting motion between two consecutive top fields or between two consecutive bottom fields corresponding to the set of frames determined in step a, and determining one or more blocks in the top field or bottom field having motion, wherein each block is a matrix of predetermined size containing pixels;
   c. determining one or more candidate blocks within the top field or bottom field determined in step b, comprising the steps of:
      calculating a vertical gradient for the motion area of the current top field and current bottom field;
      thresholding the vertical gradient using a predefined threshold;
      processing the thresholded image using a morphological operation for getting regions corresponding to block errors;
      determining a corresponding horizontal edge and a corresponding vertical edge for each rectangular region; and
      creating one or more candidate blocks using the horizontal edge and the vertical edge;
   d. verifying the candidate blocks DCT statistics for determining the blocks with grid pattern block error, comprising the steps of:
      determining DCT statistics for the candidate blocks and for a predetermined size of neighbouring blocks by calculating a DC component, summation of AC coefficients, and summation of low frequency components;
      comparing the summation of AC coefficients of the candidate block with a predefined threshold;
      comparing the result of division of summation of low frequency components by summation of AC components of the candidate block with a predefined threshold; and
      setting the neighboring blocks high if summation of AC components of the neighboring block is greater than half of the summation of AC components of the candidate block and if the neighboring blocks are set high in a vertical, horizontal or diagonal line alignment then the candidate error block is rejected;
   e. verifying for block variation visibility, comprising the steps of:
      detecting if the block is present in the previous frame by calculating Sum of Absolute Difference of the block in a region of interest in previous frame, number of edges found in that region and structural similarity index for the structural similarity measure in the previous frame;

calculating the mean of the block and deviation of each pixel value from the block mean; and calculating the transitions of the deviations; and f. validating the candidate block as an erroneous block if the transitions are greater than a predefined threshold.

2. The method as claimed in claim 1, wherein the step of detecting a scene change comprises calculating the difference between a histogram of a current frame and a histogram of a previous frame and comparing the difference with a predetermined threshold.

3. The method as claimed in claim 1, wherein the step of detecting motion within the frame and determining one or more blocks having motion comprises calculating absolute difference between a current frame and a previous frame.

4. The method as claimed in claim 3, wherein the step of detecting motion within the frame further comprises of summing up the difference up over a 8×8 non-overlapping window and if the sum exceeds a threshold, then window block and its 4 neighbourhood blocks are set as region having motion.

5. The method as claimed in claim 1, wherein the morphological operation comprises a morphological close operation on the frame with a 7×7 mask and then a morphological open operation on the resultant frame using a 7×3 mask.

6. A system having a processor and associated memory for detecting block errors in a video sequence having a plurality of frames, the frame being composed of a plurality of top fields and a plurality of bottom fields, the system comprising:

a scene change detection module configured for detecting a scene change and determining a set of frames corresponding to a single scene;

a motion detection module configured for detecting motion between two consecutive top fields or between two consecutive bottom fields corresponding to the set of frames determined in step a, and configured for determining one or more blocks in the top field or bottom field having motion, wherein each block is a matrix of predetermined size containing pixels;

a candidate detection module configured for determining one or more candidate blocks within the determined top field or bottom field, wherein the candidate detection module is configured for:

calculating a vertical gradient for the motion area of the current top field and current bottom field;

thresholding the vertical gradient using a predefined threshold;

processing the thresholded image using a morphological operation for getting regions corresponding to block errors;

determining a corresponding horizontal edge and a corresponding vertical edge for each rectangular region; and creating one or more candidate blocks using the horizontal edge and the vertical edge;

a candidate block verification module configured for verifying the candidate blocks DCT statistics for determining the blocks with grid pattern block error, wherein the candidate block verification module is configured for:

determining DCT statistics for the candidate blocks and for a predetermined size of neighbouring blocks by calculating a DC component, summation of AC coefficients, and summation of low frequency components;

comparing the summation of AC coefficients of the candidate block with a predefined threshold;

comparing the result of division of summation of low frequency components by summation of AC components of the candidate block with a predefined threshold; and setting the neighbouring blocks high if summation of AC components of the neighbouring block is greater than (summation of AC components of the candidate block*0.5) and determining if the candidate block depicts an error behaviour and not an artefact due to a horizontal/vertical/diagonal edge, based on the neighbourhood blocks set as high; and a block variation visibility verification module for verifying for block variation visibility, wherein the block variation visibility verification module is configured for:

detecting if the block is present in the previous frame by calculating Sum of Absolute Difference of the block in a region of interest in previous frame, number of edges found in that region and structural similarity index for the structural similarity measure in the previous frame;

calculating the mean of the block and deviation of each pixel value from the block mean;

calculating the transitions of the deviations; and validating the candidate block as an erroneous block if the transitions are greater than a predefined threshold.

* * * * *